(12) United States Patent
Malitz et al.

(10) Patent No.: US 10,133,928 B2
(45) Date of Patent: *Nov. 20, 2018

(54) ADVANCED SEMI-AUTOMATED VECTOR EDITING IN TWO AND THREE DIMENSIONS

(71) Applicant: DigitalGlobe, Inc., Longmont, CO (US)

(72) Inventors: Seth Malitz, Longmont, CO (US); Jacek Grodecki, Longmont, CO (US)

(73) Assignee: DigitalGlobe, Inc., Longmont, CO (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/681,043

(22) Filed: Apr. 7, 2015

(65) Prior Publication Data

US 2016/0012276 A1    Jan. 14, 2016

Related U.S. Application Data

(63) Continuation-in-part of application No. 13/942,356, filed on Jul. 15, 2013, now abandoned, which is a continuation of application No. 13/417,568, filed on Mar. 12, 2012, now Pat. No. 8,488,845, which is a continuation of application No. 12/606,918, filed on Oct. 27, 2009, now Pat. No. 8,155,391, which is a continuation-in-part of application No. 11/764,765, filed on Jun. 18, 2007, now Pat. No. 7,653,218, which is a continuation-in-part of application No. 11/416,276, filed on May 2, 2006, now abandoned.

(60) Provisional application No. 61/976,483, filed on Apr. 7, 2014.

(51) Int. Cl.
*G06K 9/00* (2006.01)

(52) U.S. Cl.
CPC ....... *G06K 9/0063* (2013.01); *G06K 9/00651* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,796,189 A * | 1/1989 | Nakayama | ......... | G01C 21/3632 340/990 |
| 5,428,721 A * | 6/1995 | Sato | ......... | G06F 3/04845 345/650 |
| 5,847,956 A * | 12/1998 | Bronfeld | ......... | G06T 17/10 345/420 |
| 6,043,825 A * | 3/2000 | Glenn | ......... | G06T 11/206 345/419 |
| 8,681,176 B1 * | 3/2014 | Maurer | ......... | G01C 21/367 340/995.1 |

(Continued)

OTHER PUBLICATIONS

Diel, Epipolar Constraints for Vision-Aided Inertial Navigation, Mar. 19, 2007, IEEE.*

*Primary Examiner* — Alex Liew
(74) *Attorney, Agent, or Firm* — Galvin Patent Law LLC; Brian R. Galvin

(57) ABSTRACT

A system for advanced vector editing, comprising a vector analysis server that analyzes vector information, a routing calculation server that calculates routes from the vector information, and a rendering engine that produces visualizations from the routing information, and several methods for advanced vector editing in two- and three-dimensional visualizations.

13 Claims, 9 Drawing Sheets

(56) References Cited

U.S. PATENT DOCUMENTS

| | | | | |
|---|---|---|---|---|
| 2001/0005425 A1* | 6/2001 | Watanabe | ............... | G06T 17/00 |
| | | | | 382/154 |
| 2001/0033281 A1* | 10/2001 | Yoshida | .................. | G06T 17/30 |
| | | | | 345/420 |
| 2005/0231531 A1* | 10/2005 | Ohkubo | .................. | G06T 11/20 |
| | | | | 345/619 |
| 2007/0096945 A1* | 5/2007 | Rasmussen | ............ | G01C 21/32 |
| | | | | 340/995.1 |
| 2009/0040224 A1* | 2/2009 | Igarashi | .................. | G06T 19/00 |
| | | | | 345/427 |

* cited by examiner

ADVANCED SEMI-AUTOMATED VECTOR EDITING IN TWO AND THREE DIMENSIONS

CROSS-REFERENCE TO RELATED APPLICATIONS

This application claims the benefit of, and priority to, U.S. provisional patent application Ser. No. 61/976,483, filed on Apr. 7, 2014 and titled "ADVANCED VECTOR EDITING", the entire specification of which is incorporated herein by reference in its entirety. This application is a continuation-in-part of U.S. patent application Ser. No. 13/942,356, titled "SEMI-AUTOMATIC EXTRACTION OF LINEAR FEATURES FROM IMAGE DATA INCLUDING PATH WIDTH ATTRIBUTION", which was filed on Jul. 15, 2013, which is a continuation of U.S. patent application Ser. No. 13/417,568, titled "SEMI-AUTOMATIC EXTRACTION OF LINEAR FEATURES FROM IMAGE DATA", now patented as U.S. Pat. No. 8,488,845, which was filed on Mar. 12, 2012, which is a continuation of U.S. patent application Ser. No. 12/606,918, titled "SEMI-AUTOMATIC EXTRACTION OF LINEAR FEATURES FROM IMAGE DATA", now patented as U.S. Pat. No. 8,155,391, which was filed on Oct. 27, 2012, which is a continuation-in-part of U.S. patent application Ser. No. 11/764,765, titled "SEMI-AUTOMATIC EXTRACTION OF LINEAR FEATURES FROM IMAGE DATA", now patented as U.S. Pat. No. 7,653,218, which was filed on Jun. 18, 2007 which is a continuation-in-part of U.S. patent application Ser. No. 11/416,276, titled "SEMI-AUTOMATIC EXTRACTION OF LINEAR FEATURES FROM RADAR IMAGE DATA", now abandoned, which was filed on May 2, 2006, the entire specifications of each of which is incorporated herein in its entirety by reference.

BACKGROUND OF THE INVENTION

Field of the Art

The disclosure relates to the field of geometric vector (path, curve) editing, especially (but not exclusively) when the vectors have a background context such as a two-dimensional raster image, three-dimensional surface model, or three-dimensional stereo image, and especially (but not exclusively) as the vectors and the background context related to remotely-sensed imagery.

Discussion of the State of the Art

Commercial geographic information system (GIS) packages such as ERDAS IMAGINE™ and ESRI ARCMAP™ are products that (among other things) enable the user to modify the trajectories of existing vectors in a viewer. Often these vectors correspond to linear features in a raster image also displayed in the viewer underneath the vectors. The user performs an edit by grabbing a vertex (waypoint) on a vector with the mouse cursor, and then dragging it to a new location within the viewer. This process can be tedious and tiresome if there are many vertices on many vectors that need to be moved. Additionally, these interfaces do not allow image content to automatically influence the rerouting of the vectors. Instead, the rerouting is determined entirely by the user's mouse clicks.

Using traditional implementations, editing vector trajectories is a manual, granular, and tedious process. Depending on the spatial accuracy required of the resulting vectors (in relation to the corresponding linear features of the underlying raster image), the task of vector editing with traditional tools can be very costly in terms of time and personnel.

What is needed is a system (or systems) of software tools to edit existing vectors that is more automated and efficient than traditional tools, that supports the editing of both two-dimensional and three-dimensional vectors, and that enables the background context to automatically influence the rerouting of vectors if so desired. If the three-dimensional vectors represent a special class of linear features in the background context (e.g., single-line hydrology features), then it is desirable that the editing tools should automatically enforce any geometric constraints on the edited vectors that are appropriate for the class of linear features being modeled. It would be useful to have more automated and efficient tools for editing vectors in the absence of any background context. A traditional tool of the latter kind is ADOBE PHOTOSHOP™, which allows the user edit vectors by inserting and dragging vertices (waypoints) and by manipulating vector tangents into those waypoints (e.g., via lever-arms).

SUMMARY OF THE INVENTION

Accordingly, the inventor has conceived of preferred embodiments of various capabilities in the invention, including graphical user interfaces and back-end processing, that provide increased automation when a user wants to reroute two-dimensional or three-dimensional linear feature vectors so that they more faithfully represent corresponding linear features in the background context.

According to a preferred embodiment of the invention, a system for rerouting image vectors comprising a vector analysis server stored and operating on a network-connected computing device, a routing calculation server stored and operating on a network-connected computing device, and a rendering engine stored and operating on a network-connected computing device, is disclosed. According to the embodiment, a vector analysis server may be utilized to perform analysis operations on received vectors such as (for example) retrieving and analyzing vectors from a vector storage such as a database or other data storage means (such as, for example, integral or removable hardware-based storage such as a hard disk drive, or software-based storage schema common in the art). Additionally, an analysis server may analyze raster images such as by retrieving from a raster storage, for example such as map images or similar raster-based image data. These analyzed vectors and rasters may then be provided to a routing calculation server, that may then identify or associate a plurality of vector points or paths with a raster image, for example identifying a vector-based path and correlating it with a raster-based satellite image of a physical space, forming a combined "route" representing a vector path through the physical space.

Calculated routes may then be provided to a rendering engine, that may analyze the routes and form visualizations of the combined vector and raster data such as may be presentable on a viewer such as a display screen, for example for review by a human user. Additionally, a user may interact with the visualization presented using a variety of input devices such as (for example) a computer mouse or keyboard, such as to manipulate the visualization or modify the information being presented. User input may be received by the rendering engine and utilized to update the rendering appropriately (such as to zoom in or out, for example), or may be further provided by the rendering engine to a routing calculation server as needed, for example to recalculate a route based on user modification (such as according to any of the methods described below, referring to FIGS. 6-7). As needed, modified routes may be further provided to a vector analysis server, for example to analyze new vector points based on user input, or for storage for future reference.

According to another preferred embodiment of the invention, a plurality of software-based processing methods for execution on a system for rerouting image vectors, are disclosed.

Image-Based Single-Point Detour Mode:

According to an embodiment of one capability in the invention, a method for editing two-dimensional vectors in the manner of "Image-Based Single-Point Detour Mode" is disclosed. Existing vectors are displayed on a raster image in a viewer. In an initial step with regard to this mode, a circle appears, centered at the instantaneous location of the mouse cursor in the viewer. This circle delimits a region of influence around the interaction cursor. In a next step, the cursor may be moved by the user, while the circle moves with it, remaining centered at the cursor. In a next step, the circle may come in contact with an initial vector V, and in a next step the vector may be rerouted in real-time (or near real-time) through the cursor location and within the confines of the circle. The rerouted portion is image-based (i.e., utilizes image content) and is realized as a least cost path relative to a cost raster derived (possibly on-the-fly, possibly pre-computed) from the original image raster. The reroute is confined to the interior of the circle, originates at one point where the circle intersects the vector V, necessarily passes through or near the mouse cursor, and terminates at the other point where the circle intersects V. The interface allows for visual preview of the reroute prior to committing the reroute to a persistent data storage. In a next step, the interface accepts a user input (e.g., a click of the mouse) in relation to the current cursor location and performs the actual commit of the rerouted vector. In an optional step, the interface accepts a user input (e.g., scroll of the mouse wheel) to alter the radius of the circle, thereby altering the radius of influence. It will be appreciated by one having ordinary skill in the art that various alternative approaches to single-point detour mode may be used, according to the invention. For example, instead of a circle centered at the cursor, some other shape referenced at the cursor to represent the region of influence might be used, such as a rectangle, a triangle, a trapezoid, a diamond, and so forth. Furthermore, there could be a user input that actively alters the shape or dimensionality of this region of influence. Instead of mouse clicks and mouse wheel scroll, other forms of user interaction known in the art, including for example multitouch gestures, may be used.

Image-Based Multi-Point Detour Mode:

As an additional embodiment, a method for editing two-dimensional vectors in the manner of "Image-Based Multi-point Detour Mode", is disclosed. Existing vectors are displayed on a raster image in a viewer. In this mode, in an initial step, the user may place a mouse-click at location $P_1$ in the vicinity of a vector V in the viewer. In subsequent steps, the user may place additional mouse clicks at locations $P_2$, $P_3$, ..., $P_{k-1}$ in the viewer, and in a final step, the user indicates the last location in the sequence, $P_k$, with a double mouse click, again in the vicinity of V. In an initial step, upon clicking at location $P_1$ the shortest line segment from V to $P_1$ may be constructed and then displayed in the viewer. In a final step, upon double-clicking at location $P_k$, the shortest line segment from $P_k$ to V may be constructed and displayed in the viewer. In a middle step, after clicking at location $P_{j+1}$, part of the reroute of vector V is a path from $P_j$ to $P_{j-1}$, computed in real-time (or near real-time) and displayed to the viewer. It is realized as a least cost path from $P_j$ to $P_{j-1}$ relative to a cost raster derived (possibly on-the-fly, possibly pre-computed) from the original image raster. An option is that the computation of this portion of the reroute begins prior to the mouse click at $P_{j+1}$ (i.e., it may begin when the mouse cursor is idle at location $P_{j+1}$ for a threshold length of time.) While the mouse-cursor location $P_{j+1}$ is in motion or while the least cost path computation from $P_j$ to $P_{j+1}$ is not yet completed, the reroute portion from $P_j$ to $P_{j+1}$ may be depicted in the viewer as a straight line segment. When the double-click finally occurs at location $P_k$ the rerouted path through $P_1$, $P_2$, $P_3$, ..., $P_k$ replaces the corresponding section of the initial vector V.

It should be appreciated that the vector editing techniques described herein may be applicable to vectors in two- or three-dimensional spaces interchangeably, as will be illustrated below (referring to FIGS. 6-7).

According to another embodiment of the invention, a plurality of vector viewing and routing interfaces are disclosed. According to the embodiment, a stereo viewing system including 4 viewers tied together may comprise: A non-editable stereo viewer, two monoscopic viewers (one for each monoscopic raster), and a Z-profile viewer showing Z vs. XY-arc-length along any vector. Whenever reference is made to coordinates X, Y, Z, they should be understood to be referring to object space unless otherwise indicated. When editing vectors through the monoscopic displays, two modes will be entertained: Lock-Z and Float-Z. In Lock-Z mode, the points on a three-dimensional vector are allowed to move in XY but not Z. In Float-Z mode, the points on a three-dimensional vector are allowed to move in XY and Z. When editing in the Z-profile display, there is only one mode—points on a three-dimensional vector are allowed to move in Z, but not XY. In some embodiments, vector editing techniques described herein are applied to three-dimensional monoscopic images.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
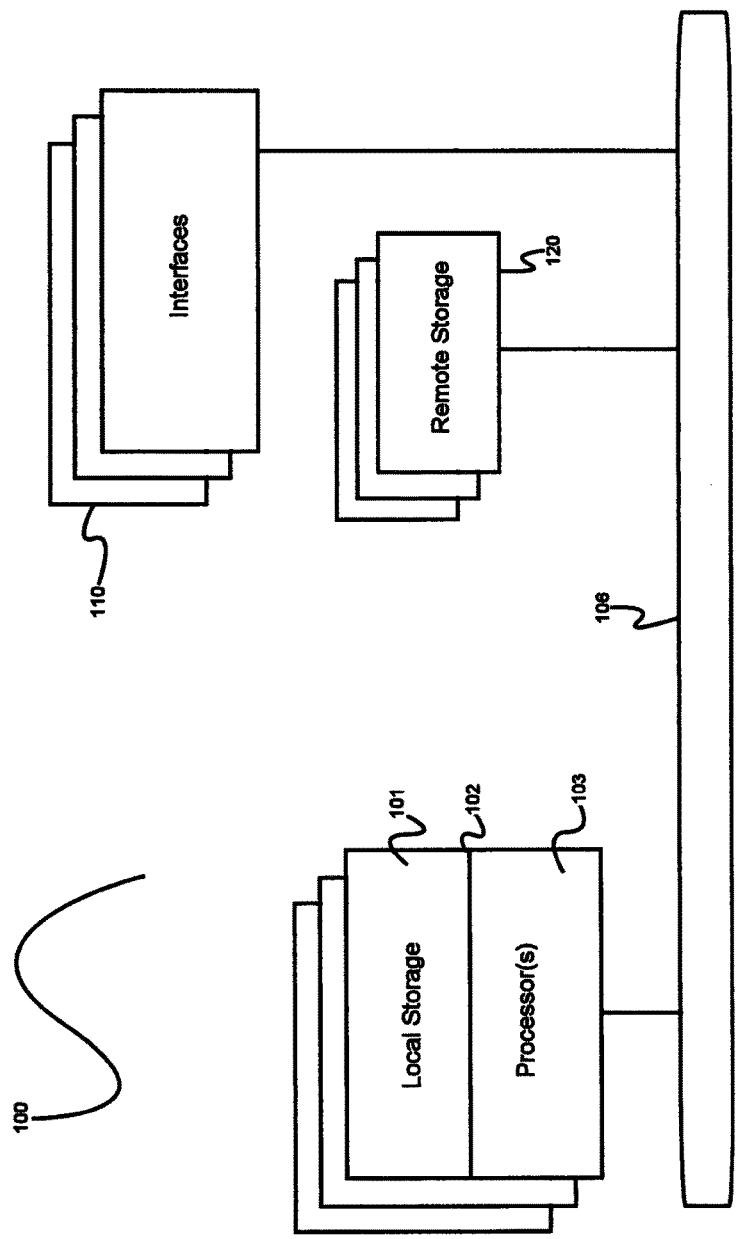
FIG. 1 is a block diagram illustrating an exemplary hardware architecture of a computing device used in an embodiment of the invention.

The inventor has conceived of preferred embodiments of the various aspects (special cases) of the invention, graphical user interfaces and back-end algorithms, to assist in the rerouting of linear feature vectors with goal that a rerouted vector more faithfully represents an intended linear feature within the background context (if present.)

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
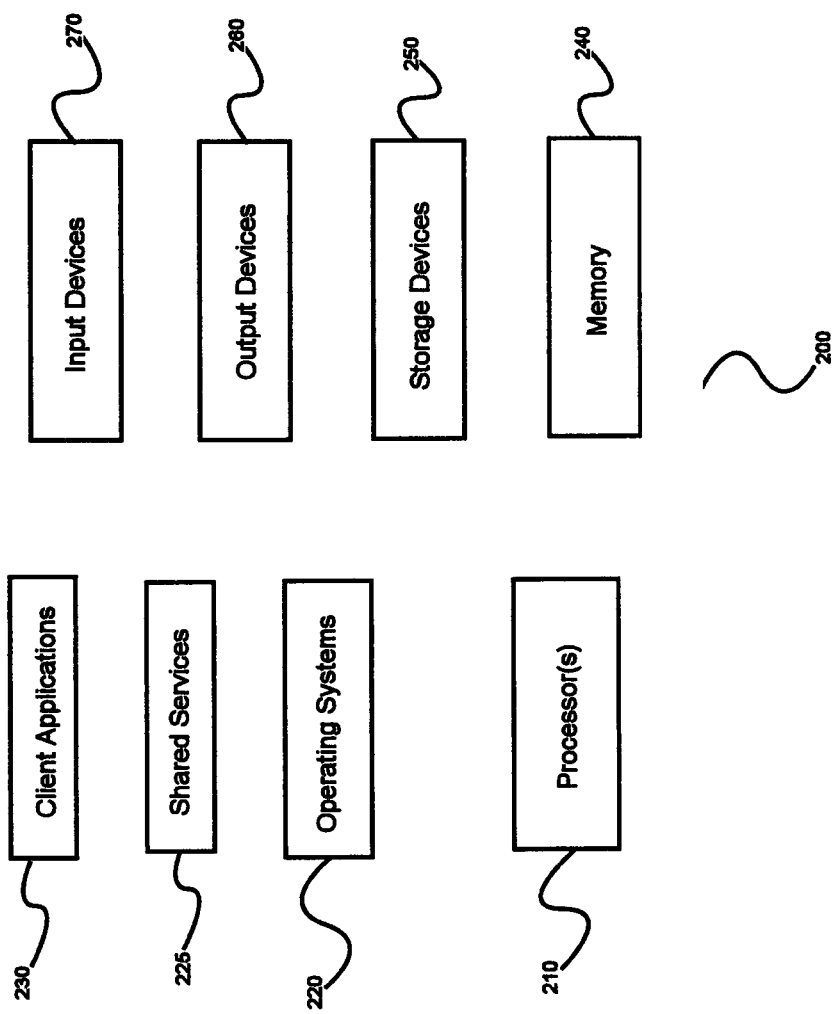
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
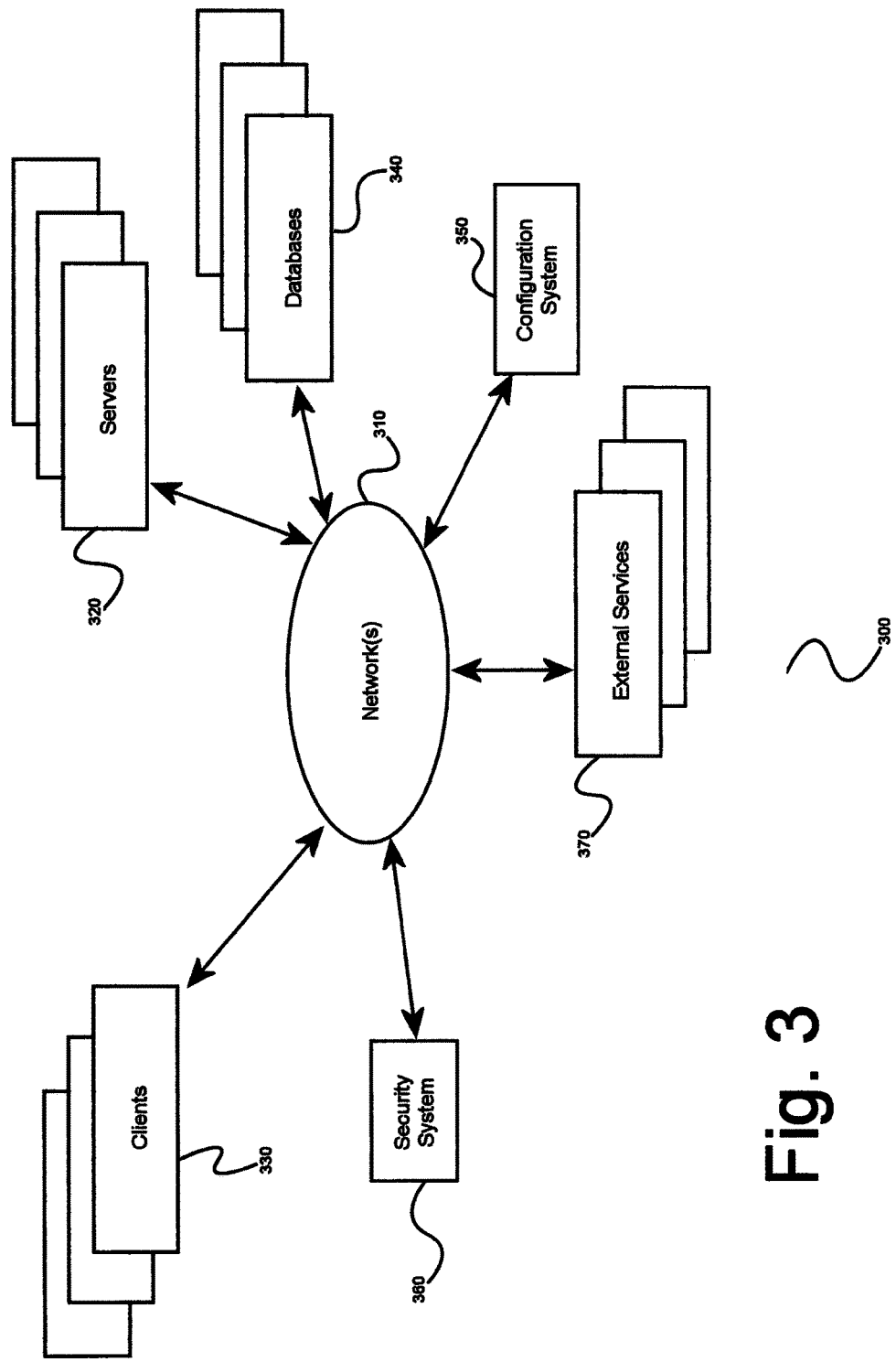
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
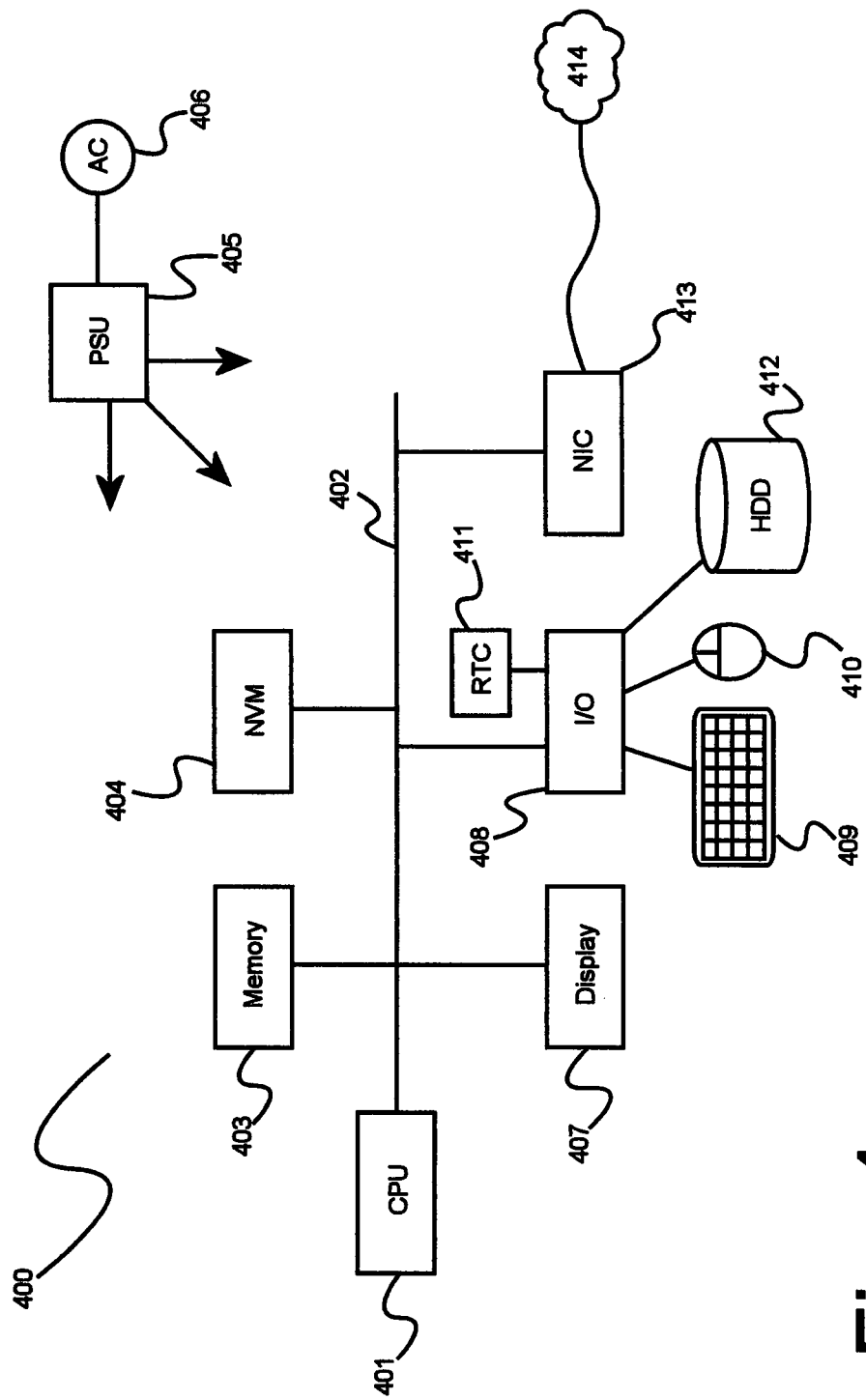
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Detailed Description of Embodiments

Figure 5:
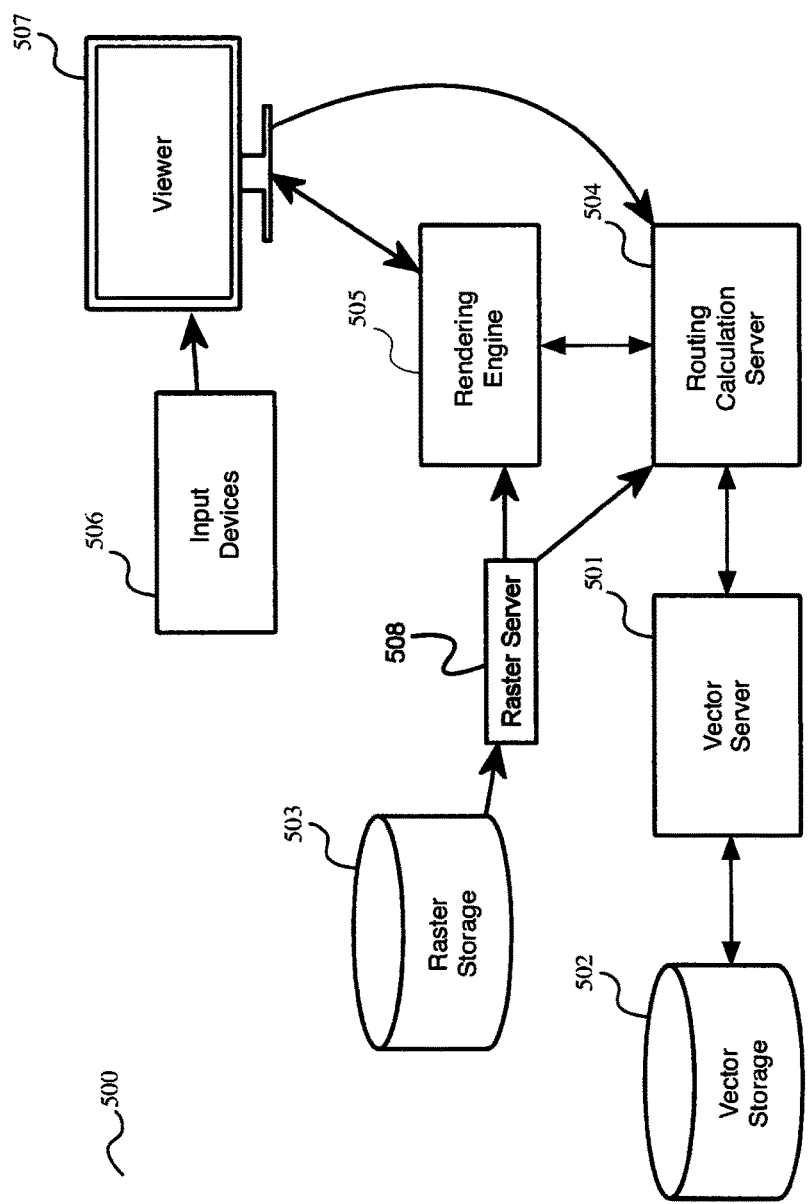
FIG. 5 is a block diagram of an exemplary system architecture for advanced vector editing, according to a preferred embodiment of the invention.

FIG. 5 is a block diagram of an exemplary system architecture 500 for advanced vector editing, according to a preferred embodiment of the invention. According to the embodiment, a vector analysis server 501 may be stored and operating on a network-connected computing device, and may be utilized to perform analysis operations on received vectors such as (for example) retrieving and analyzing vectors from a vector storage 502 such as a database or other data storage means (such as, for example, integral or removable hardware-based storage such as a hard disk drive, or software-based storage schema common in the art). Additionally, an analysis server 501 may analyze raster images such as by retrieving from a raster storage 503, for example such as map images or similar raster-based image data. These analyzed vectors and rasters may then be provided to a routing calculation server 504, that may then identify or associate a plurality of vector points or paths with a raster image, for example identifying a vector-based path and correlating it with a raster-based satellite image of a physical space, forming a combined "route" representing a vector path through the physical space.

Calculated routes may then be provided to a rendering engine 505, that may analyze the routes and form visualizations of the combined vector and raster data such as may be presentable on a viewer 507 such as a display screen, for example for review by a human user. Additionally, a user may interact with the visualization presented using a variety of input devices 506 such as (for example) a computer mouse or keyboard, such as to manipulate the visualization or modify the information being presented. User input may be received by the rendering engine 505 and utilized to update the rendering appropriately (such as to zoom in or out, for example), or may be further provided by the rendering engine 505 to a routing calculation server 504 as needed, for example to recalculate a route based on user modification (such as according to any of the methods described below, referring to FIGS. 6-7). As needed, modified routes may be further provided to a vector analysis server 501, for example to analyze new vector points based on user input, or for storage for future reference.

It should be appreciated that according to the embodiment, various means of connection or communication between the components of a system 500 may be utilized according to the invention interchangeably or simultaneously, such as for example a direct, physical data connection (such as via a data cable or similar physical means), a software-based connection such as via an application programming interface (API) or other software communication means (such as may be suitable, for example, in arrangements where multiple system components may operate on a single hardware device such as a computing server or workstation), or any of a variety of network connections such as via the Internet or other data communications network. It should therefore be appreciated that the connections shown are exemplary in nature and represent only a selection of possible arrangements, and that alternate or additional connections may be utilized according to the invention.

Figure 6:
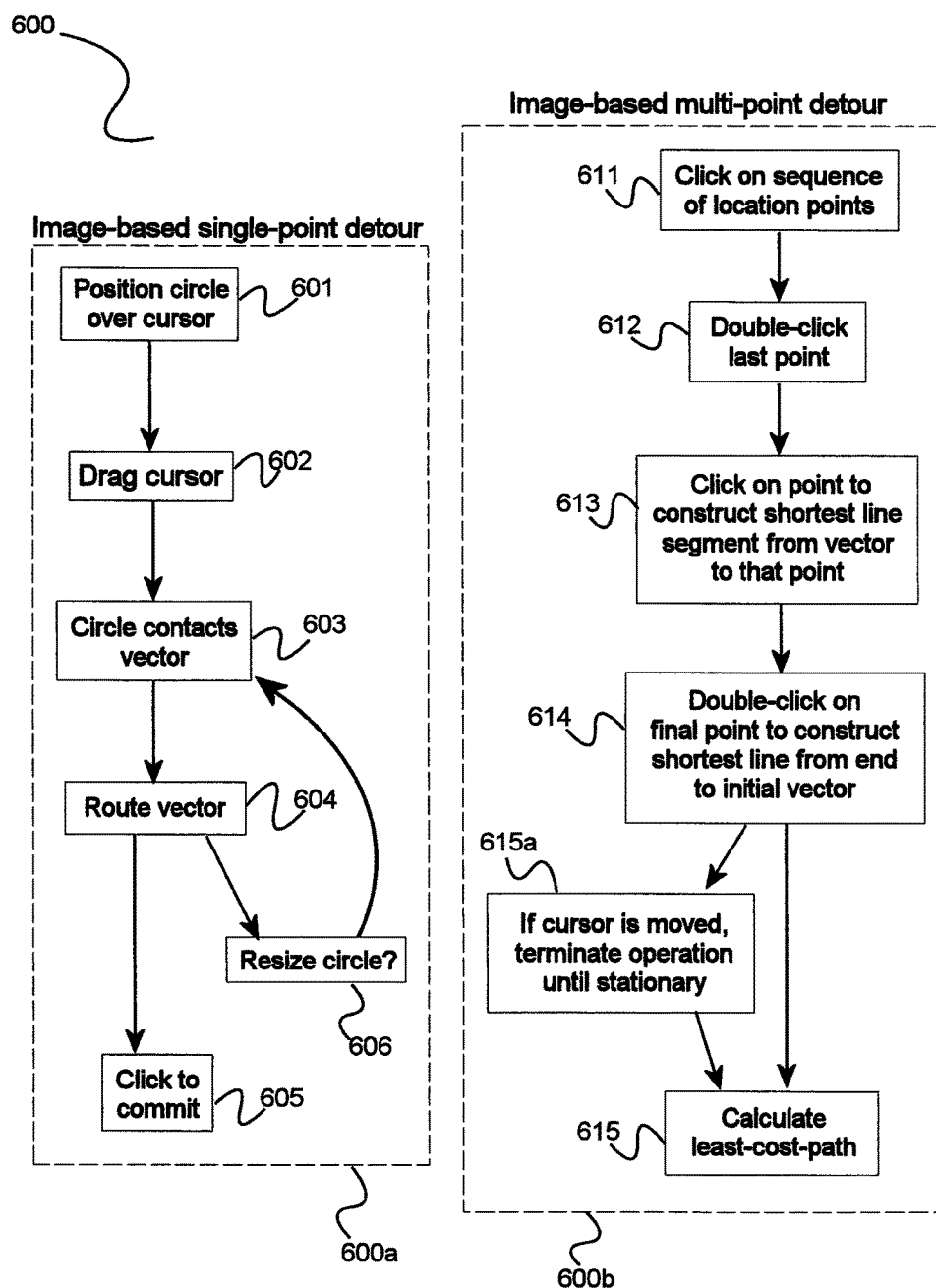
FIG. 6 is a method flow diagram illustrating an exemplary set of methods for two-dimensional image-based vector routing, according to a preferred embodiment of the invention.

FIG. 6 is a method flow diagram illustrating an exemplary set of methods 600 for two-dimensional image-based vector routing, according to a preferred embodiment of the invention. As illustrated, a variety of routing modes may be utilized, and means of manipulating a vector according to each mode are described. Reference may be made to the use of mouse clicks as a means of user input, however it should be appreciated that this is exemplary and a variety of additional or alternate input means may be utilized according to the invention, and the use of a computer mouse is described for clarity.

Image-Based Single-Point Detour Mode 600a:

In this mode, a circle may appear in a display (for example, such as a graphical vector routing display described below with reference to FIG. 9) centered at the instantaneous location of the mouse cursor in an initial step 601. This circle may delimit a region of influence around the interaction cursor. In a next step 602, the cursor may be moved by the user, while the circle moves with it, remaining centered at the cursor. In a next step 603, the circle may come in contact with an initial vector V, and in a next step 604 the vector may be rerouted in real-time (or near real-time) through the cursor location and within the confines of the circle. The rerouted portion is image-based (i.e., utilizes image content) and realized as a least cost path relative to a cost raster derived (possibly on-the-fly, possibly pre-computed) from the original image raster. The reroute is confined to the interior of the circle, originates at one point where the circle intersects the vector V, necessarily passes through or near the mouse cursor, and terminates at the other point where the circle intersects V. The interface allows for a visual preview of the reroute prior to committing it to persistent data storage. In a next step 605, the interface accepts a user input (e.g., a click of the mouse) in relation to the current cursor location and performs the actual commit of the rerouted vector. In an optional side step 606, the interface accepts a user input (e.g., scroll of the mouse wheel) to alter the radius of the circle thereby altering the radius of influence.

There are a variety of situations and behaviors of the tool that may occur in preview and routing operations, some examples of which are described below. In one situation, while the circle is in contact with the vector V, if the cursor is moved prior to the mouse click, then the current reroute is abandoned and a new reroute is initiated once the cursor comes to rest for a threshold length of time. While the circle is in contact with the vector V and while either the cursor is either in motion or the reroute computation is not yet completed, the reroute portion is depicted in the display as a "rubber band" consisting of two tandem straight line segments, one that goes from a point where the circle intersects the vector V to the mouse cursor location, and one that goes from the mouse cursor location to the other point where the circle intersects V.

In another possible situation, the circle may contain exactly one endpoint of the initial vector within its interior. Call it A. Let B denote a point on the vector that intersects the circle. The points A and B here now act as the begin-point and end-point of the reroute.

In another situation, the circle may contain both endpoints of the initial vector within its interior. Call them A and B. The points A and B here now act as the begin-point and end-point of the reroute.

Image-Based Multi Point Detour Mode 600*b*:

In this mode, in an initial step 611 the user may place a mouse-click at location $P_1$ in the vicinity of a vector V in the viewer. In subsequent steps, the user may place additional mouse clicks at locations $P_2, P_3, \ldots, P_{k-1}$ in the viewer, and in a final step 612, the user indicates the last location in the sequence, $P_k$, with a double mouse click, again in the vicinity of V. In an initial step 613, upon clicking at location $P_1$ the shortest line segment from V to $P_1$ may be constructed and then displayed in a viewer. In a final step 614, upon double-clicking at location $P_k$ the shortest line segment from $P_k$ to V may be constructed and displayed in the viewer. In a middle step 615 after clicking at location $P_{j+1}$, part of the reroute of vector V is a path from $P_j$ to $P_{j+1}$, computed in real-time (or near real-time) and displayed to the viewer. It is realized as a least cost path from $P_j$ to $P_{j+1}$ relative to a cost raster derived (possibly on-the-fly, possibly pre-computed) from the original image raster. An option 615*a* is that the computation of this portion of the reroute begins prior to the mouse click at $P_{j+1}$ (i.e., it begins when the mouse cursor is idle at location $P_{j+1}$ for a threshold length of time.) While the mouse-cursor location for $P_{j+1}$ is in motion or while the least cost path computation from $P_j$ to $P_{j+1}$ is not yet completed, the reroute portion from $P_j$ to $P_{j+1}$ may be depicted in the viewer as a straight line segment. When the double-click finally occurs at location $P_k$ as in step 614, the rerouted path through $P_1, P_2, P_3, \ldots, P_k$ replaces the corresponding section of the initial vector V.

It should be appreciated that other devices besides a computer mouse may be utilized according to the invention, that max cost path could be used instead of least cost path, that the region of influence need not be delimited by a circle (e.g., could be a square) and that it need not be centered at the mouse cursor, and such as may be suited to the nature of the invention disclosed herein.

Figure 7:
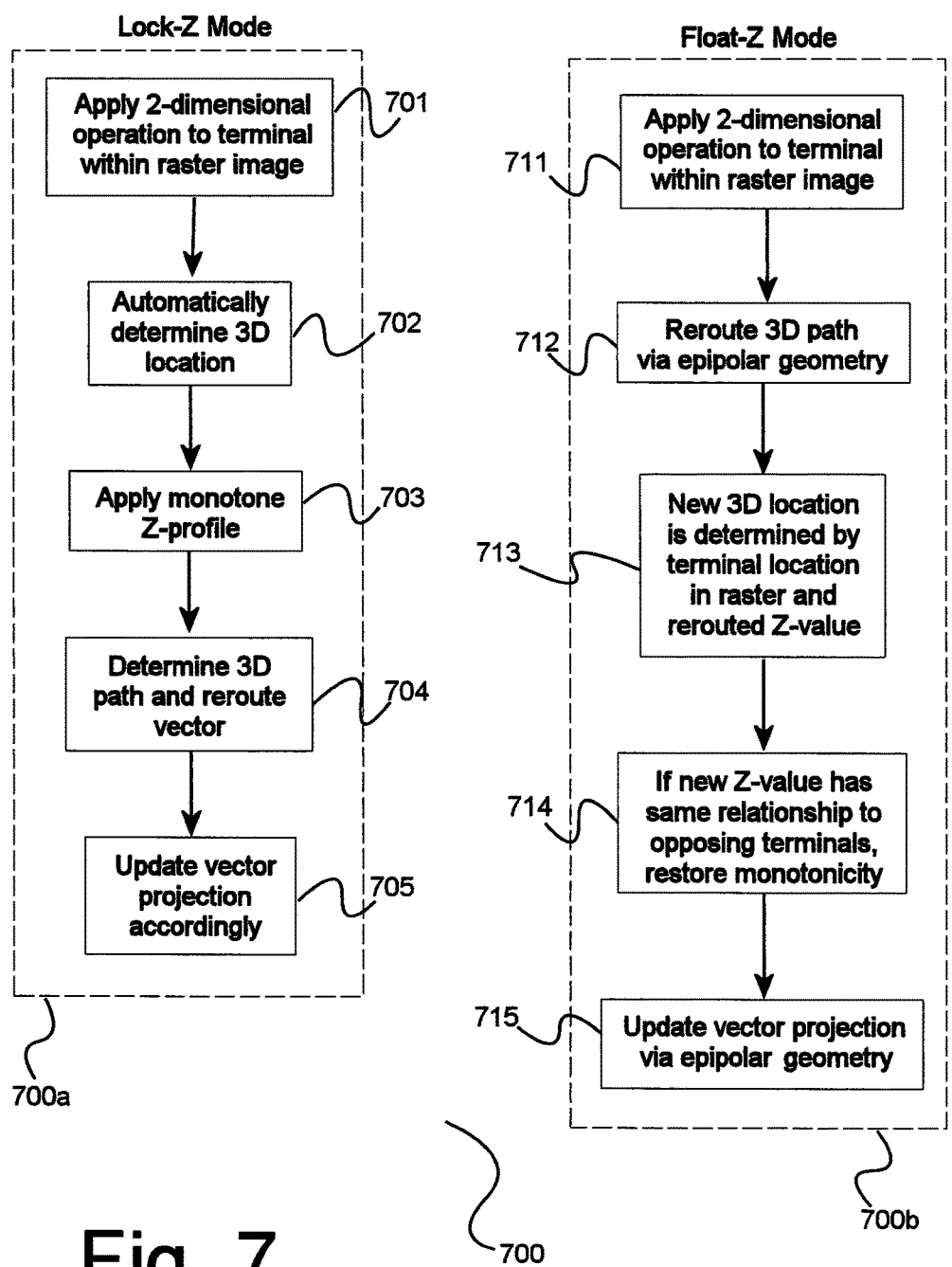
FIG. 7 is a method flow diagram illustrating an exemplary set of methods for three-dimensional image-based vector routing, according to a preferred embodiment of the invention.

FIG. 7 is a method flow diagram illustrating an exemplary set of methods 700 for three-dimensional image-based vector routing, according to a preferred embodiment of the invention. It should be appreciated that while reference may be made to the specific arrangements of vector interfaces or viewers described in the present application, these techniques may be applicable on a variety of visual or hardware configurations according to the invention.

Let T denote the 3D three-dimensional terminal of a 3D three-dimensional vector V, and perhaps other 3D three-dimensional vectors as well. Let $V_A$ denote the 2D two-dimensional projection of V to monoscopic raster A, and $V_B$ denote the 2D two-dimensional projection of V to monoscopic raster B. The user performs the Move Terminals operation in either raster A or raster B.

Lock-Z Mode 700*a*:

In an initial step 701, a user may apply a two-dimensional "Move Terminals" operation to terminal $T_A$ in raster A. let $T2_A$ denote the new location of $T_A$ in raster A, and let $P_A$ denote the new path in raster A from a point on $V_A$ to $T2_A$. Since Z is locked, the corresponding three-dimensional terminal location T2 may be automatically determined in a next step 702. In a next step 703, a Z-profile may be assigned to $P_A$ that is strictly monotone in Z and consistent with the predetermined values. In a next step 704, the corresponding three-dimensional path P may be determined and thus the three-dimensional reroute of V is determined. In a final step 705, $V_B$ may be updated accordingly via the epipolar geometry. It should be noted that each of the described steps may be performed automatically, and in a real-time fashion so as to remove the need for human interaction and improve operation.

Float-Z Mode 700*b*:

This is at first identical to the operation for non-hydrology vectors. Suppose the three three-dimensional hydrology vectors that are involved are U, V, W, with U and V forming a tandem three-dimensional path (UV) that is strictly monotonic in Z. After applying the two-dimensional Move Terminals to terminal $T_A$ on path $(UV)_A$ in raster A in an initial step 711, the path (UV) is rerouted in three-dimensional via the epipolar geometry in a next step 712. In a next step 713 the new three-dimensional location (in object space) of the terminal T is determined by its new location $T_A$ in raster A and it's Z-value on the rerouted path (UV). If the Z-value for the new T has the same above/below relationship with respect to the opposing terminals in each of U, V, and W as the old Z-value for T did, then monotonicity of U, V, W can be restored in a next step 714. In a final step 715, the epipolar geometry may be used to project the new path W and new location of T back down to raster B.

Figure 8:
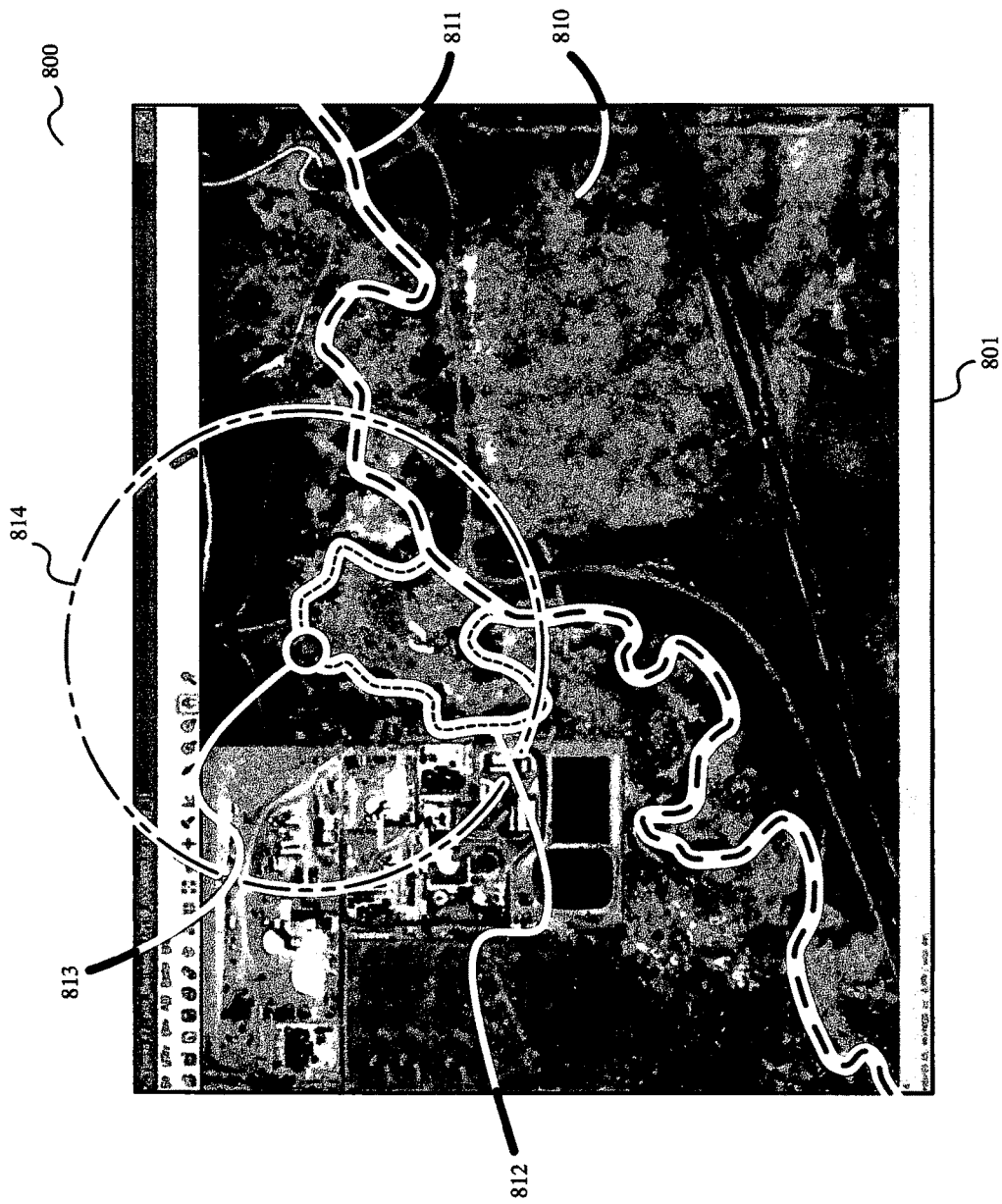
FIG. 8 is an illustration of an exemplary vector routing user interface, illustrating the use of manual routing correction in a projection of a vector onto a raster image.

FIG. 8 is an illustration of an exemplary vector routing user interface 800, illustrating the use of Image-Based Single-Point Detour rerouting as described previously (referring to FIG. 6). In a graphical viewer 801, a linear feature vector of interest may be displayed as an overlay 811 viewed on top of an image raster 810. As illustrated, the initial vector 811 is shown and is intended to represent a single line drainage in the image raster 810. However, the vector 811 has missed a gooseneck of the drainage 812 and needs to be rerouted to incorporate that gooseneck 812. Two modes of image-based rerouting may be provided to the user: Single-Point Detour and Multi-point Detour, as described above in reference to FIG. 6. Single-Point Detour mode is driven by user-specified cursor location 813 and a circular region of influence 814 centered at that location in the viewer. As illustrated, the rerouting user interface 800 may comprise an efficient semi-automated two-dimensional graphical vector-editing tool 801. The interface 801 enables a user to edit (reroute) an existing two-dimensional vector, which typically represents a linear feature in remotely sensed imagery, so that it better coincides with that linear feature. In these tools, the vectors may be displayed as an overlay 811 on the relevant image raster 810 such as to give those vectors context.

A graphical user interface 800 may also provide a semi-automated capability to geometrically edit (reroute) two-dimensional vectors without the requirement that the vectors be tied to an image raster. From a user perspective, the capability may behave similarly to the previously described two-dimensional vector editing capability, but simply would not require a raster in the background or any geo-spatial reference applied to the vectors; that is, it may behave similarly to image-independent smart vector editing. Moreover, the tools and techniques of the invention may be used in an analogous way to non-image-based techniques (that is, vector-based techniques) introduced in U.S. Pat. No. 8,488,845 and its antecedents, which were incorporated by reference above. Such a capability would have application in the geo-spatial realm, but also in any realm where there is a need to modify the geometry of existing two-dimensional vectors. For example, Adobe PHOTOSHOP™ allows the user to create and edit vectors for, say, artistic purposes, via tools that insert drag-able waypoints with lever-controlled splines onto a display. Editing vectors in this manner, however, is not as easy as would be the case with the proposed invention.

Semi-automated and automated software tools for image-based linear feature extraction (as two-dimensional vectors) from remotely sensed imagery sometimes create vectors with poor geometric accuracy. To correct such errors in two-dimensional vectors, highly efficient "smart" two-dimensional image-based vector editing tools are made available, according to the embodiment. These software tools include the following functionalities:

Single-Point Detour—the user places 1 mouse click near a vector, and the vector is smoothly re-routed through that point (described above in FIG. 6);

Multi-Point Detour—the user places a sequence of N mouse clicks, the first and last of which are located near a vector, and the vector is smoothly re-routed through the sequence (described above in FIG. 6);

Move Terminals—the user places a mouse click near the termination point of one or more vectors, and the vectors are smoothly re-routed to terminate at the point;

The integration of all the above with Automatic Topology Cleaning (ATC), which is the automatic elimination of gaps (under-shoots) and dangles (over-shoots) where vectors are intended to be perfectly incident to one another; and A visual interface to support all the above.

Figure 9:
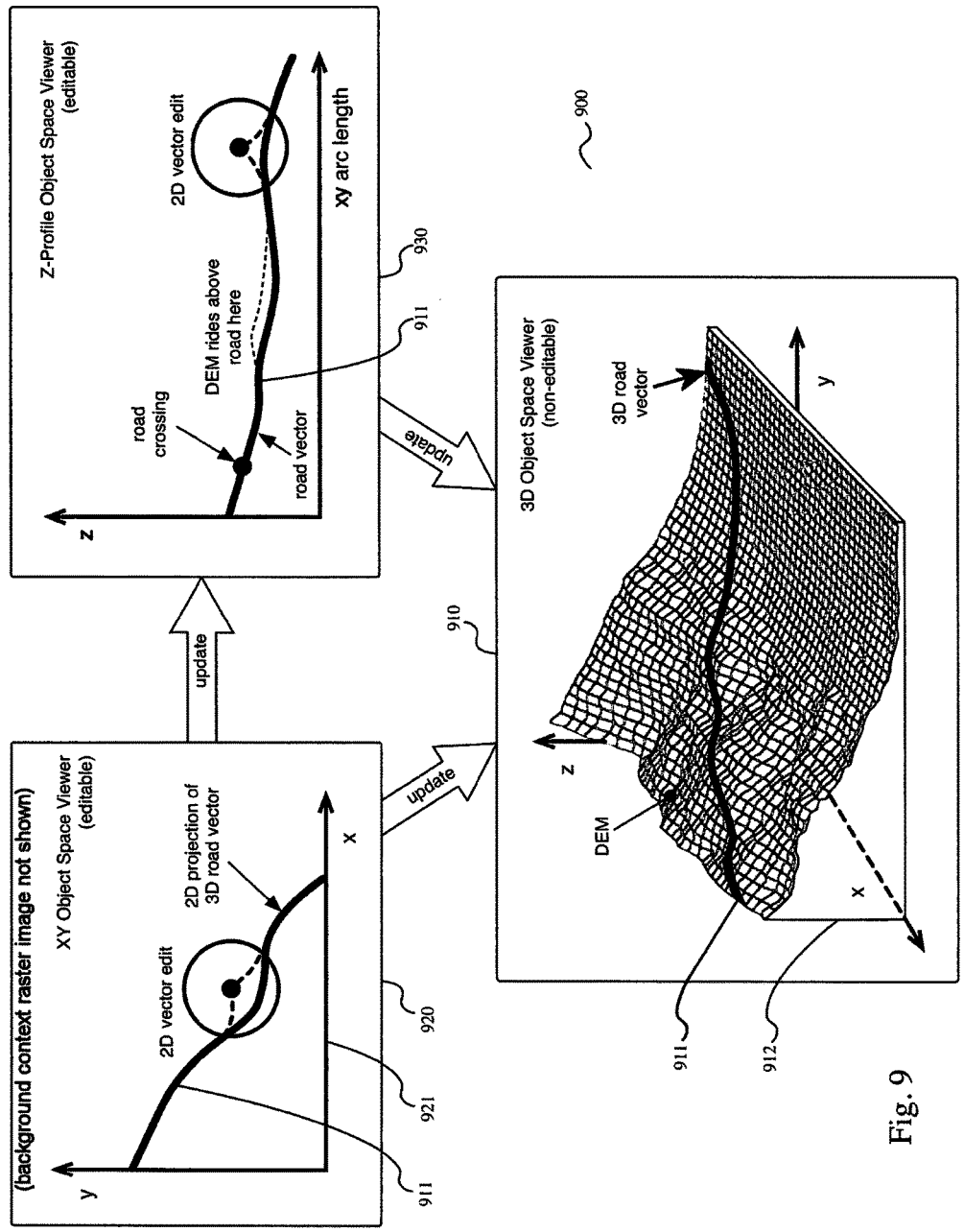
FIG. 9 is an illustration of an exemplary vector routing user interface, illustrating the use of vector routing in a three-dimensional vector projection.

According to the embodiment, FIG. 9 is a diagram illustrating a user interface 900, for a monoscopic three-dimensional extension of the above image-independent and image-based capabilities to the realm of three-dimensional vectors against a Digital Surface Model (DSM). (Here a DSM plays the role of the background context for three-dimensional vectors—akin to how a raster image acts as the background context for two-dimensional vectors.) A user interface 900 for visualizing and editing three-dimensional linear feature vectors in this scenario may comprise a plurality of graphical viewers such as:

A three-dimensional viewer 910 that can display the three-dimensional vectors 911 against a digital surface model (DSM) 912 or, optionally, against an empty three-dimensional space. The viewer may optionally offer perspective or non-perspective viewing, and enable the user to pan, zoom, or yaw about the line of sight. The DSM 912 may be opaque or semi-transparent or represented as a wireframe. A semi-transparent DSM 912 may allow a user to see where a three-dimensional vector 911 lies above or below the landscape represented by the DSM 912. (Alternatively the vector 911 could always be displayed on top of the opaque DSM 912, but have a portion of the vector rendered differently when trying to indicate that this portion of the vector corresponds to a trajectory below the DSM, for example using a dashed line or color change.) The viewer may support pan, zoom, and yaw about the line of sight, such that a user may control or manipulate the view as described above. The three-dimensional vectors 911 in this viewer may optionally not be editable through this viewer.

A two-dimensional overhead XY-viewer 920 may display the three-dimensional vectors 911 projected down to the XY-plane 921 of a raster image. The viewer may, as above, support pan, zoom, and yaw about the line of sight. The three-dimensional vectors 911 as shown in the viewer 920 may be editable in XY via existing two-dimensional smart image-based vector editing tools (such as those described previously, referring to FIG. 6, and image-independent two-dimensional vector editing tools introduced in U.S. Pat. No. 8,488,845 and its antecedents, which were incorporated above by reference) including two-dimensional Automatic Topology Cleaning (ATC).

A two-dimensional Z-profile viewer 930 may display, for any designated three-dimensional vector 911, its profile of XY-arc-length vs. Z, optionally overlaid on the corresponding "vertical slice" of the DSM 912. The viewer may support pan and zoom. The profile shown in the viewer 930 may be editable in Z via the existing two-dimensional image-independent smart vector editing tools Single-Point Detour and Multi-Point Detour, as described previously. In this manner, the local Z-coordinate of a vector 911 can be positioned above, below, or on the DSM 912.

The viewers may be synchronized, such as in the following manner. Updating the Z-profile view 930 of a vector may cause an automatic update to the three-dimensional view 910 only. Updating the XY-view 920 of a vector may cause an automatic update to the three-dimensional view 910 and optionally also to the Z-profile view 930 as follows: the rerouted XY-portion of the vector 911 may be automatically projected from the XY view vertically to the DSM 912.

When reference is made to "automatically project a portion of the vector in the XY view vertically to the DSM" it should be understood to mean automatically project the vector to the DSM, automatically smooth it, and automatically prevent the smoothed result from dropping locally below a DSM. (If the user intends that a portion of a vector drop below a DSM (e.g., perhaps to represent a tunnel), then the user must explicitly edit the Z-profile view of the vector to do so.) To ensure that the smoothed projected vector does not drop below the DSM, the system automatically does the following: It projects the rerouted portion of the vector in the XY view vertically, not to the DSM, but to a slight vertical offset of the DSM in the positive Z direction. It then smooths the resulting Z-profile of the vector using standard techniques.

The interface may be allowed to support more than one Z-profile viewer at a time, each viewer showing a different vector. This might be especially useful when two vectors under consideration cross each other or are incident to each other in XY.

As described previously, all viewers in the system may be maintained in synchrony. When a mouse cursor is moved along a vector in any of the viewers, then any other viewers depicting that vector may display the cursor location in corresponding fashion through live updates to the displayed views.

If vector U crosses vector V at location (x, y) in the XY view, but has higher Z-value at that location, then such an arrangement may be indicated in every viewer that depicts both U and V. If U and V have the same Z-value at the crossing (x, y), then such state of affairs may also be indicated in every viewer that depicts both U and V.

In what follows, we require the following definition. Suppose vector U crosses (or is incident to) vector V in the XY view. If the user intends, in the course of vector editing, that U and V maintain a three-dimensional coincidence at the crossing (incidence), then U and V are said to be bound together at the crossing (incidence.) Otherwise U and V are said to be unbound at the crossing (incidence). For example, if two three-dimensional road vectors cross each other at a 4-way stop, then those vectors are bound at the crossing. However, if one road vector at the crossing represents an overpass and the other an underpass, then the two vectors are unbound at the crossing. Any of the three viewer types may enable the user to bind or unbind two vectors at a crossing (incidence). Any of the three viewer types may indicate which crossings (incidences) were set by the user as bound and which were set by the user as unbound.

Vector Editing in XY View Integrated with Three-Dimensional Automatic Topology Cleaning (ATC):

When a portion of a three-dimensional vector V is rerouted in the XY view using the image-independent and image-based two-dimensional smart vector editing tools, this may include two-dimensional automatic topology cleaning. The only other issue that remains to be explained is how editing a vector V in the XY view affects the Z-profile of a vector U that is bound to V at an affected XY crossing (incidence). In this case, within the vicinity of the new XY crossing (incidence), a portion of the Z-profile of U is automatically adjusted as necessary to maintain the three-dimensional coincidence of U and V at the new crossing. (Alternatively, the roles of U and V could be interchanged in this previous sentence.) If a portion of V was rerouted by the Move Terminals operation in the XY view, and the result was intended to make a terminal of V coincident to a point on the vector U, then the effected portion of the Z-profile of V is automatically adjusted as necessary to get the desired three-dimensional coincidence.

Vector Editing in Z-Profile View Integrated with Three-Dimensional Automatic Topology Cleaning (ATC):

This view enables a user to modify the Z-profile of a three-dimensional vector V while preserving the XY trajectory of that vector. The modification is driven by image-independent two-dimensional smart vector editing tools. We must explain what to do when there is another vector U that is bound to V at an effected XY crossing (incidence). If the user adjusts the Z-profile of V at the crossing (incidence), then the Z-profile of U is automatically adjusted in the vicinity of that crossing (incidence) so as to maintain the three-dimensional coincidence.

In the Z-profile viewer for V, whenever there is a vector U that crosses (or is incident to) V in XY, a "dot" representing the crossing (incidence) may be automatically displayed in the viewer. The dot's location in the viewer is at coordinates (W, Z), where W is the XY arc length along V (as projected in the XY plane) where the crossing (incidence) occurs, and Z is the Z-value of U at the crossing (incidence). The dot may have different visual characteristics to indicate whether or not U and V are bound at the crossing (incidence).

Designate and Approve Underpass, Overpass, Bridge, Tunnel:

Through a Z-profile Viewer, the user may edit a portion of a vector so that it drops below the DSM (as would be the case with an underground tunnel.) The user may then indicate to the viewer that this portion of the vector is user-approved to drop below the DSM, and the viewer may then visually indicate in return that such approval has occurred. Any of the three viewers may visually indicate where a vector has dropped below the DSM and whether that portion of the vector is user-approved. Similar designation, approval, visual indicators might apply to underpass, overpass, and bridge portions of a vector.

Systematic User-Review:

The system may provide a mechanism to facilitate efficient systematic user-review of all vectors. This mechanism might be a grid structure within the XY view. In "Review Mode", the user may be required to examine all the grid-cells one at a time, where examining a grid-cell means necessarily reviewing all the three-dimensional vectors whose projection intersects the cell, checking each vector for accuracy and correctness, and individually committing them to persistent data storage after all necessary touch up corrections have been made Additionally, other capabilities of the two-dimensional editing suite disclosed above may be provided in the three-dimensional version, according to the invention.

According to a further embodiment of the invention, a stereoscopic three-dimensional extension of the above capabilities to the realm three-dimensional vectors against a stereo raster image pair is disclosed. There is no DSM in this setting. In this case, the stereo landscape is the background context for the vectors. The user interface for visualizing and editing three-dimensional linear feature vectors against a stereo background may comprise a plurality of graphical viewers such as:

- A stereo three-dimensional viewer displaying the three-dimensional vectors against a (possibly semi-transparent) stereo view of the landscape. It will be possible for a user to see where a vector lies above or below the landscape. The viewer supports pan, zoom, and yaw about line of sight. This viewer may not support direct editing of the vectors.
- Two monoscopic two-dimensional image (which may or may not be optionally ortho-rectified according to a particular arrangement, use, or operation) viewers, one for each raster image in the stereo pair. The three-dimensional vectors in object space are projected onto the raster image in each viewer via the sensor model. Each viewer supports pan, zoom, and yaw about line of sight. The two viewers are tied together with respect to these operations, i.e., performing one of these operations in a viewer automatically causes the corresponding operation to be performed in the other. Let's call the two viewers (or images) A and B. Let V be a three-dimensional vector in object space. In viewer A, the user may edit V's projection, via the 2D image-independent or image-based vector editing tools, without causing a change in its projection in viewer B. This is geometrically valid because there is always a three-dimensional rerouting of V that is consistent with the projections displayed in each the two monoscopic viewers. This is seen by consideration of the epipolar geometry or sensor model. Editing V's projection in either viewer A or viewer B may be accomplished via the image-independent or image-based two-dimensional smart vector editing tools, including the integration with two-dimensional Automated Topology Cleaning (ATC).
- A two-dimensional Z-profile viewer that may display, for any designated three-dimensional vector, its profile of XY-arc-length vs. Z, where X, Y, and Z are the coordinates of object space. The viewer may support pan and zoom. The profile in the viewer may be editable in Z via the two-dimensional image-independent smart vector editing tools Single-Point Detour and Multi-Point Detour described above.

The four viewers may be synchronized as follows. Editing the Z-profile view of a vector may cause an automatic update to the other three views. Editing a vector in one of the two monoscopic image views may cause an automatic update to the three-dimensional stereo view of the vector and to the Z-profile view of the vector (the update to both being driven by the sensor model), but does not cause an update to the other monoscopic image view.

When the mouse cursor is moved along a vector in either monoscopic image view or in the Z-profile view, then any other viewer depicting that vector may display a corresponding cursor location in relation to the vector in that view. If vector U crosses (or is incident to) vector V at some XY location in object space, and U has a higher Z-value than V at that crossing, then this state of affairs will be indicated in every viewer that depicts both U and V. If U and V have the same Z-value in object space at the crossing, then such state of affairs will also be indicated in every viewer that depicts both U and V.

In what follows, we require the following definition. Suppose vector U crosses (or is incident to) vector V in one (typically both) of the monoscopic image views. If the user intends, in the course of vector editing, that U and V maintain three-dimensional coincidence at the crossing (incidence), then U and V are said to be bound together at the crossing (incidence.) Otherwise U and V are said to be unbound at the crossing (incidence). For example, if two three-dimensional road vectors cross each other at a 4-way stop, then those vectors are bound at the crossing. However, if one vector at the crossing represents an overpass and the other an underpass, then the two vectors are unbound at the crossing. Any of the three viewer types may enable the user to bind or unbind two vectors at a crossing (incidence.) Any of the three viewer types may indicate which crossings (incidences) were set by the user as bound and which were set by the user as unbound.

Vector Editing in Monoscopic Image View Integrated with Three-Dimensional Automatic Topology Cleaning (ATC):

When a projected portion of a three-dimensional vector V in object space is rerouted in a monoscopic image viewer A using the image-independent and image-based two-dimensional smart vector editing tools (referring to FIG. 6), the edit may include two-dimensional automatic topology cleaning. The only other issue that remains to be explained is how an edit of V in the monoscopic image viewer A affects a three-dimensional vector U that is bound to V at an effected XY crossing (incidence) in object space. In this case, within the vicinity of the new XY crossing (incidence), a portion of U is automatically adjusted in object space to maintain three-dimensional coincidence with V at the new crossing, while not causing U's trajectory in monoscopic image viewer B to be altered. That such rerouting of U is possible is evident from consideration of the epipolar geometry or sensor model. If a portion of V was rerouted by the Move Terminals operation in monoscopic image viewer A, and the result was intended to make a terminal of V coincident to a point on the three-dimensional vector U, then the effected portion of V is automatically adjusted in object space as necessary to get desired three-dimensional coincidence, while not causing V's trajectory in monoscopic image viewer B to be altered.

Vector Editing in Z-Profile View Integrated with Three-Dimensional Automatic Topology Cleaning (ATC):

This view enables a user to modify the Z-profile of a three-dimensional vector V in object space while preserving its XY trajectory in object space. The modification is driven by the image-independent two-dimensional smart vector editing tools. We must explain what to do when there is another three-dimensional vector U that is bound to V at an effected XY crossing (incidence). If the user adjusts the Z-profile of V at the crossing (incidence), then the Z-profile of U is automatically adjusted in the vicinity of that crossing (incidence) so as to maintain the three-dimensional coincidence.

In the Z-profile viewer for V, whenever there is a vector U that crosses (or is incident to) V in XY, a "dot" representing the crossing (incidence) may be automatically displayed in the viewer. The dot's location in the viewer is at coordinates (W, Z), where W is the XY arc length along V (as projected to the object space XY plane) where the crossing (incidence) occurs, and Z is the Z-value of U at the crossing (incidence). The dot may have different visual characteristics to indicate whether or not U and V are bound at the crossing (incidence).

Create and Approve Underpass, Overpass, Bridge, Tunnel:

Through the Z-profile viewer or either monoscopic image viewer, the user may designate a portion of a vector as being an underpass, overpass, bridge, or tunnel. Any other viewer may additionally and correspondingly show this designation.

Systematic Review:

The system may provide a mechanism to facilitate efficient systematic user-review of all vectors. This mechanism might be a grid structure within one of the monoscopic image views or within a new viewer that depicts XY object space. In "Review Mode", the user may be required to examine all the grid-cells one at a time, where examining a grid-cell means necessarily reviewing all the three-dimensional vectors whose projection intersects the cell, checking each vector for accuracy and correctness, and individually committing them to persistent data storage after all necessary touch up corrections have been made.

In a further embodiment of the invention, user interfaces and semi-automated three-dimensional geometric editing capability for three-dimensional hydrology vectors, while enforcing the constraints of the hydrology layer, are disclosed.

It is presumed the three-dimensional vectors have been extracted from remotely sensed imagery. As a pre-condition, it may be assumed that the initial three-dimensional vector model already satisfies the following hydrology constraints: (a) The vectors are topologically cleaned (i.e., vectors intended to meet in X and Y of object space, also meet in Z of object space); (b) the points in a vector that describe the boundary of a water body all have the same Z in object space; (c) if U and V are the vectors on opposite sides of a double line drainage, then there is a horizontal direction vector d=(a, b, 0) such that the projection of U to a plane normal to d is identical to the projection of V to the same plane; (d) the vectors have been sufficiently smoothed in X,Y,Z of object space; (e) all vectors that represent single or double line drainage have strictly monotone Z profile; (f) each vector that represents single or double line drainage has an assigned direction going from higher Z to lower Z. Additionally, some water bodies and other drainage junctions may be designated by the user as immovable in Z of object space.

According to an embodiment of the invention, a collection of three-dimensional hydrology vectors may be stored in a data structure hereafter referred to as a "hydrology graph" (HG). The hydrology graph consists of vertices and directed edges, described below, each with attendant data. The hydrology graph is a useful supporting construct for algorithms that enforce the hydrology constraints (e.g., monotonicity) after hydrology vectors have been edited.

Vertices may represent any of the following:
Junctions between
A single line drainage and a water body (e.g., lake, ocean) or other water source (e.g., snowpack, ground water emergence)
A double line drainage and a water body (e.g., lake, ocean) or other water source (e.g., snowpack, ground water emergence)
Two single line drainages
Two double-line drainages
A single line drainage and a double-line drainage
The top or bottom of a waterfall
Directed edges represent any of the following:
Single line drainage
Double line drainage
A directed edge that represents a single-line drainage owns the three-dimensional vector that corresponds to that drainage. A directed edge that represents a double-line drainage owns the two three-dimensional vectors on opposite sides of the drainage as well as the vector $d=(a, b, 0)$ described above that relates the two vectors of the double line drainage. The direction of an edge represents the water flow direction.

A vertex that represents a junction with a water body owns the three-dimensional boundary vector of the water body. All points on that vector have the same Z in object space, and this Z is assigned to the vertex. A vertex that represents a junction with a different water source (e.g., a snow pack) does not own a three-dimensional vector, but does have an assigned three-dimensional point of object space. Every other vertex is assigned just a three-dimensional point as well, a point that represents the location of the junction We now indicate how the three-dimensional vector editing operations Single-Point Detour and Multi-Point Detour and their associated user interface behaviors, described above for arbitrary three-dimensional vectors in the three-dimensional stereo and three-dimension monoscopic settings, are to be modified for three-dimensional hydrology vectors so as to automatically maintain the hydrology constraints.

In Three-Dimensional Stereo System

The user may be able to edit the Z-value of a three-dimensional vector terminal through the Z-profile viewer. Through the Z-profile viewer, the Z-value of a three-dimensional vector terminal is modified via the two-dimensional Move Terminals operation, but now constrained to move only in Z. This induces an automatic update in all three-dimensional vectors that are three-dimensionally coincident to this terminal and for which the coincidence must be maintained. This update is automatically displayed in all the viewers in accordance with the epipolar geometry or sensor model.

In Three-Dimensional Stereo System

Through a monoscopic image viewer, the Z-value of a terminal may be modified, for example, by mouse clicking near the terminal and using the mouse scroll wheel to adjust the terminal's Z-value without changing its XY location in object space. This induces an automatic update in all three-dimensional vectors that are three-dimensionally coincident to this terminal and for which the coincidence must be maintained. This update is automatically displayed in all the viewers in accordance with the epipolar geometry or sensor model.

In Three-Dimensional Monoscopic System

The user may be able to edit the Z-value of a three-dimensional vector terminal through the Z-profile viewer. Through the Z-profile viewer, the Z-value of a three-dimensional vector terminal is modified via the two-dimensional Move Terminals, but now constrained to move only in Z. This induces an automatic update in all three-dimensional vectors that are three-dimensionally coincident to this terminal and for which the coincidence must be maintained. This update is automatically displayed in all the viewers.

In Three-Dimensional Monoscopic System

Though the XY viewer, the Z-value of a terminal may be modified, for example, by mouse clicking near the terminal and using the mouse scroll wheel to adjust the terminal's Z-value without changing its XY location in object space. This induces an automatic update in all three-dimensional vectors that are three-dimensionally coincident to this terminal and for which the coincidence must be maintained. This update is automatically displayed in all the viewers.

Editing Three-Dimensional Hydrology Vectors Through the Three-Dimensional Stereo System As described above, the three-dimensional stereo viewing system consists of 4 viewers tied together: A non-editable stereo viewer, two editable monoscopic viewers, and a Z-profile viewer showing XY-arc-length vs. Z along any three-dimensional vector in object space. When editing a three-dimensional water body vector using Single-Point Detour mode or Multi-Point Detour mode in a monoscopic viewer, a Lock-Z mode will be enforced. Additionally, no Z-profile editing will be allowed for a water body vector. When editing a vector on one side of a double-line drainage using Single-Point Detour mode or Multi-Point Detour mode in a monoscopic viewer or the Z-profile viewer, a Lock-Direction mode will be enforced. Whenever a single line drainage vector or double line drainage vector is edited, the system will automatically enforce the hydrology constraints against the resulting vector, modifying the vector as necessary, and displaying the new resulting vector in all of the viewers.

In Lock-Z mode, the points on the water body vector are allowed to move in XY of object space but not Z. In this mode, when the edits are performed in one monoscopic viewer, the projection of the vector into the other monoscopic viewer is automatically updated in accordance with the epipolar geometry or sensor model. The resulting three-dimensional vector is automatically displayed accordingly in all viewers.

In Lock-Direction mode, when a double line drainage vector U is edited in a monoscopic viewer, its three-dimensional trajectory will be automatically constrained so that its projection to a plane normal to the direction vector $d=(a, b, 0)$, described above, is identical to the projection of the companion vector V (on the opposite side of the double line drainage) to the same plane. In this mode, when the edits on U are performed in one monoscopic viewer, the projection of U into the other monoscopic viewer is automatically updated in accordance with the epipolar geometry or sensor model. The resulting three-dimensional vector is automatically displayed accordingly in all viewers. In Lock-Direction mode, when U above is edited in the Z-profile viewer, the three-dimensional vector V above is automatically updated, so that its projection to a plane normal to the direction vector d=(a, b, 0) is identical to the projection of the edited vector U to the same plane. Both resulting three-dimensional vectors are automatically displayed accordingly in all viewers.

Editing Three-Dimensional Hydrology Vectors Through the Three-Dimensional Monoscopic System As described above, the three-dimensional monoscopic viewing system consists of 3 viewers tied together: A non-editable three-dimensional monoscopic viewer (possibly displaying a DSM as background), an XY viewer, and a Z-profile viewer showing XY-arc-length vs. Z along any three-dimensional vector in object space. When editing a three-dimensional water body vector using Single-Point Detour mode or Multi-Point Detour mode in the XY viewer, a Lock-Z mode will be enforced. Additionally, no Z-profile editing will be allowed for a water body vector. When editing a vector on one side of a double-line drainage using Single-Point Detour mode or Multi-Point Detour mode in the XY viewer or the Z-profile viewer, a Lock-Direction mode will be enforced. Whenever a single line drainage vector or double line drainage vector is edited, the system will automatically enforce the hydrology constraints against the resulting vector, modifying the vector as necessary, and displaying the new resulting vector in all of the viewers.

In Lock-Z mode, the points on the water body vector are allowed to move in XY of object space but not Z. The resulting three-dimensional vector is automatically displayed accordingly in all viewers.

In Lock-Direction mode, when a double line drainage vector U is edited in the XY viewer, its three-dimensional trajectory will be automatically constrained so that its projection to a plane normal to the direction vector d=(a, b, 0), described above, is identical to the projection of the companion vector V (on the opposite side of the double line drainage) to the same plane. The resulting three-dimensional vector is automatically displayed accordingly in all viewers. In Lock-Direction mode, when U above is edited in the Z-profile viewer, the three-dimensional vector V above is automatically updated, so that its projection to a plane normal to the direction vector d=(a, b, 0) is identical to the projection of the edited vector U to the same plane. Both resulting three-dimensional vectors are automatically displayed accordingly in all viewers.

Additionally, in either of the above described methods for editing three-dimensional hydrology vectors, given a three-dimensional vector V from endpoint p to endpoint q where the Z-value of p is greater than that of q, various algorithms are available to create a new vector W from p to q that is monotonically decreasing in Z and as close to V as possible according to some measure of closeness. These algorithms will be known to someone familiar in the art. In this sense, we appreciate that automatic enforcement of monotonicity can be applied to three-dimensional hydrology vectors after they have been edited by Single Point Detour, Multi-Point Detour, and Move Terminals operations.

The skilled person will be aware of a range of possible modifications of the various embodiments described above. Accordingly, the present invention is defined by the claims and their equivalents.

What is claimed is:

1. A system for advanced vector editing, comprising:
a network-connected computing device comprising a processor, a memory, and a plurality of programming instructions stored in the memory, wherein the plurality of programming instructions, when operating on the processor, cause the processor to further comprise:
a vector analysis server;
a vector routing calculation server that provides a means for computing routes from vector data, wherein the routing calculation comprises at least the calculation of a path according to epipolar geometry; and
a rendering engine software module;
wherein the vector analysis server analyzes a plurality of vector points and provides the results of analysis to the routing calculation server;
wherein the vector routing calculation server calculates vector routes based at least in part on the received vector analysis information, and provides the vector route information to the rendering engine; and
wherein the rendering engine software module provides a means for production of visualizations based at least in part on the vector routing information received.

2. The system of claim 1, further comprising a database, wherein the database stores vector information and provides the stored information to the vector analysis server for use.

3. The system of claim 2, further wherein the database stores raster information.

4. The system of claim 1, further comprising a viewer, wherein the rendering engine provides the visualizations to the viewer.

5. The system of claim 4, wherein the viewer is a visual display screen, wherein the screen displays the visualizations for viewing by a human user.

6. The system of claim 1, further comprising a plurality of user input devices, wherein the user input devices allow a human user to interact with the visualizations.

7. A method for advanced vector editing, comprising the steps of:
positioning, using a rendering engine;
a cursor on a raster image displayed on a viewer;
calculating, using a vector routing calculation server, a radius around the cursor;
calculating, using a vector routing calculation server, a path according to epipolar geometry;
positioning the radius in contact with a vector path on the raster image; and
recalculating the vector path through the cursor location within the radius.

8. The method of claim 7, further comprising the step of resizing the radius prior to recalculating the vector path.

9. The method of claim 7, further comprising the step of selecting additional points prior to recalculating the vector path.

10. The method of claim 9, wherein the additional points are selected by a human user using a computer input device.

11. The method of claim 9, further comprising the step of recalculating the vector path through each of the selected points.

12. The method of claim 7, further comprising the steps of:
- determining, using a vector routing calculation server, a three-dimensional location from the 2-dimensional raster image;
- determining a three-dimensional vector path;
- recalculating the vector path according to the three-dimensional space; and
- updating, using a rendering engine, the vector projection on the raster image.

13. The method of claim 12, further comprising the steps of:
- determining a new three-dimensional location based at least in part on the raster image and the vector path calculation; and
- updating, using a rendering engine, the vector projection via the epipolar geometry.

* * * * *